Dec. 21, 1948.                R. L. PAPERMASTER                2,456,837
                    THERMOMETER CASE WITH ROTATING MEANS
                           Filed Oct. 18, 1946
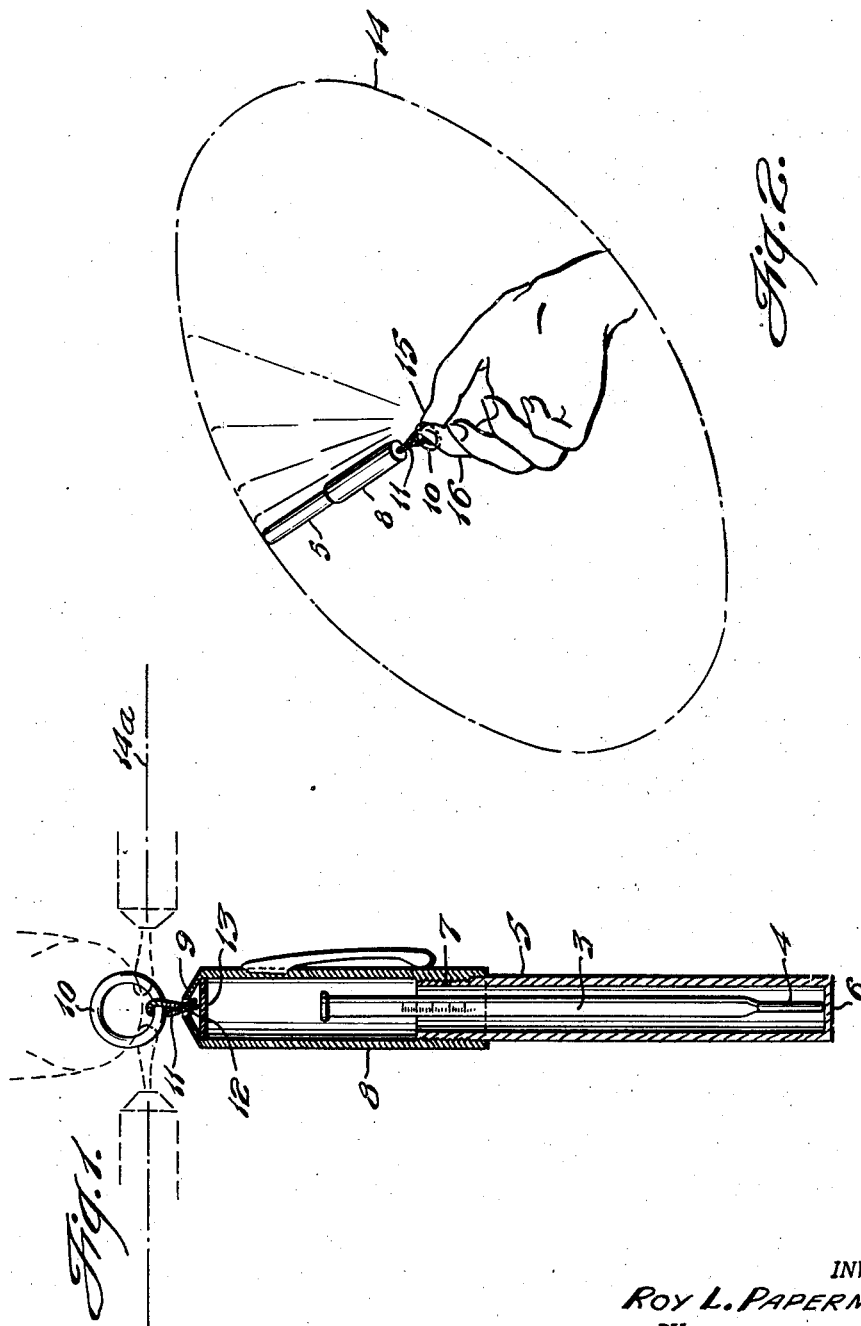
INVENTOR.
ROY L. PAPERMASTER
BY
ATTORNEY Patented Dec. 21, 1948

2,456,837

UNITED STATES PATENT OFFICE 2,456,837

THERMOMETER CASE WITH ROTATING MEANS

Roy L. Papermaster, Los Angeles, Calif.

Application October 18, 1946, Serial No. 704,258

2 Claims. (Cl. 73—373)

This invention relates to a thermometer case having means whereby the case may be swung in a generally circular path so as to subject a thermometer therein to centrifugal force so as to "shake down" the fluid from the tubular portion of the thermometer into the bulb thereof.

There have been a number of prior proposals for a thermometer case of this general plan. One of them proposes to utilize a cord or chain attached to the cover portion of the thermometer case and adapted to be wrapped and unwrapped from the finger of the operator as the case is swung. An objection to this device is the length of the cord or chain which tends to become tangled, knotted, or detached from the case during continued use thereof. Another prior proposal has been that of employing a short length of chain attached at one end to the case and at another end to a safety pin. A still further proposal of which I am aware is the proposed use of a bar transversely swiveled with reference to one end of the case and having at one end a loop through which the finger of the operator may be passed in order to support the bar for rotation of the case thereon. Such an arrangement is rather difficult and expensive to manufacture and assemble. All of these arrangements, and, so far as I am aware, any that have been proposed heretofore, provide for either a purely circular or a gradually spiraling path of movement of the thermometer case, and therefore depend upon a comparatively steady centrifugal pull on the fluid in the thermometer to effect the "shaking down" action.

The modern fever thermometer, with its extremely fine hairline duct in the stem thereof, is not easy to shake down. The capillary attraction of this minute duct is so great, and the weight of the fluid in the duct is so infinitesimal, that an extremely high degree of force must be applied to the thermometer in order to assure the amalgamation of the fluid into a single continuous column.

With these problems in mind, my invention has as one of its objects to provide a fever thermometer case having means whereby it may be swung in a path that, although generally circular, departs from a circular path by the reciprocation of the center of rotation back and forth, whereby to apply to the thermometer a combination of centrifugal force that is greatly accentuated at the two positions of greatest distance from the general center of rotation.

Another object of the invention is to provide a thermometer case having an extremely simple and inexpensive attachment to provide for the swinging movement above referred to.

Other objects of the invention will become apparent in the ensuing specification, taken with the appended drawings, in which:

Fig. 1 is a longitudinal sectional view through a thermometer case embodying my invention, with a fever thermometer enclosed therein; and Fig. 2 is a perspective view illustrating the use of my improved case in shaking down the thermometer.

As an example of one form in which my invention may be embodied, I have shown in the drawing a thermometer case for a fever thermometer including a stem portion 3 and a bulb portion 4. The case comprises a barrel 5, which may be cylindrical in accordance with customary practice, having a bottom 6 and a threaded end 7 through which the cap 8 may be attached by screwing it thereon. The cap 8 has a conical end wall 9 which is provided with a central opening.

My invention provides a ring 10 and a loop 11 of flexible material which is looped around the ring 10 and has its ends passed through the opening in the wall 9 and knotted inside of the cover 8 as at 12. A disc 13 is inserted into the cover 8 and cooperates with the end wall 9 to define a space in which the knotted portion of the loop 11 is confined.

The loop 11 is of elastic, stretchable material. It may comprise a rubber band, covered with a braided fabric covering to give it a pleasing appearance.

In the use of my improved thermometer case, the ring 10 is grasped between the thumb and forefinger, or the thumb and middle finger, of the operator's hand, and the case is swung in a generally circular path, indicated at 14 in Fig. 2. The ring 10 remains in substantially the same plane or parallel planes during the swinging operation. The preferred mode of operation is to reciprocate the ring back and forth in a substantially single plane (as indicated at 14a in Fig. 1), after having started the swinging of the case in the path 14. As the case moves around the path 14, the loop 11 will alternately slide from one side to the other of the portion of the ring 10 projecting beyond the thumb 15 and finger 16 between which the ring 10 is grasped. This back and forth sliding movement of the loop 11 causes the center about which the case is swinging to shift back and forth, and the centrifugal force developed in the thermometer to be greatly accentuated at the most remote points on the path 14. The accentuation of centrifugal force is magnified by the stretching of the elastic loop 11, which tends to yield and elongate as the case approaches one of the remote points on the path 14 and to contract as the case moves away from the remote point. The result is a series of jerks at the remote points on the path 14, as the elastic limit of the loop 11 is reached, at which point the centrifugal force mounts momentarily to a much higher value than its average value. The degree of force applied to the thermometer at the extreme point is much higher than can be applied by holding the thermometer between the fingers and shaking in the conventional manner, since the speed that can be imparted to the movement of the thermometer when swinging it in a circle in this manner is much greater than the speed that can be imparted directly through the movement of the hand holding the thermometer, and the abruptness of change of movement is much greater because of the increased speed. The inertia of the hand is largely eliminated from the operation. One of the advantages of the invention is the simplicity of the attachment, and its inexpensive character. An equally important advantage is a close coupled relation between the ring 10 and the end wall 9 of the case, eliminating substantial lengths of chain or cord that tend to become snarled or, in any event, "in the way" when the case is being opened and closed, or laid away. In this connection, the stretchable characteristic of the loop 11 makes it possible to employ an extremely closely coupled normal connection between the loop and the case, the loop 11 elongating under centrifugal force to provide the desired additional radius of gyration in operation. In actual use, the loop 11 may extend to twice its normal length, drawing the ring 10 back to a close coupled relation when the swinging is stopped.

I claim:
1. In a thermometer case, a pair of case sections, a ring adapted to be held between the fingers of an operator, with a portion thereof projecting, and a short length of elastic material looped around said ring and secured to the end of one of said sections, said elastic material being stretchable to extend the distance between the ring and the end of the case when the case is swung in a generally circular path, and being adapted to slide back and forth in said projecting portion of the ring as it is thus swung.

2. In a thermometer case, a pair of case sections, a ring adapted to be held between the fingers of an operator with a portion thereof projecting, and a tie element connecting said ring to one of said sections, said tie element being distensible under the effect of centrifugal force to extend the distance between the ring and the case when the case is swung in a generally circular path, and being inherently elastic to close the gap between the ring and the case when said force is relaxed, said tie element being loosely looped around the ring, whereby it is adapted to slide back and forth in said projecting portion of the ring when the case is thus swung.

ROY L. PAPERMASTER.

REFERENCES CITED

The following references are of record in the file of this patent:

UNITED STATES PATENTS

| Number | Name | Date |
| --- | --- | --- |
| 717,764 | Sandhop et al. | Jan. 6, 1903 |
| 720,234 | Elbrecht | Feb. 10, 1903 |
| 1,420,022 | De Carie | June 20, 1922 |
| 1,651,490 | Walker | Dec. 6, 1927 |